US006952857B2

(12) United States Patent  (10) Patent No.: US 6,952,857 B2
Ponziani  (45) Date of Patent: Oct. 11, 2005

(54) WINDOW WIPER ARM DRIVE AND WINDOW LOCK SYSTEM

(75) Inventor: Richard L. Ponziani, Centerville, OH (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 2 days.

(21) Appl. No.: 10/858,642

(22) Filed: Jun. 2, 2004

(65) Prior Publication Data

US 2004/0216259 A1 Nov. 4, 2004

Related U.S. Application Data

(60) Division of application No. 09/607,294, filed on Jun. 30, 2000, now Pat. No. 6,792,643, which is a continuation-in-part of application No. 09/169,451, filed on Oct. 9, 1998, now Pat. No. 6,109,672.

(51) Int. Cl.[7] .............................. B60S 1/08; B60S 1/16
(52) U.S. Cl. ................ 15/250.3; 15/250.31; 15/250.34; 15/250.19; 292/DIG. 29
(58) Field of Search .......................... 15/250.19, 250.3, 15/250.31, 250.34; 292/170, DIG. 29; 296/96.15, 96.17, 96.2

(56) References Cited

U.S. PATENT DOCUMENTS

| 3,583,021 A | 6/1971 | Druseikis |
| 3,713,472 A | 1/1973 | Dozois |
| 3,999,241 A | 12/1976 | Mafnas |

(Continued)

FOREIGN PATENT DOCUMENTS

| DE | 3406688 | 9/1985 |
| DE | 3815442 | 12/1988 |
| DE | G9107295.6 | 10/1991 |
| DE | G9312682.4 | 12/1993 |
| EP | 044 649 | 1/1982 |
| EP | 0 111 457 | 6/1984 |
| EP | 0 256 399 | 2/1988 |
| EP | 0 257 608 | 3/1988 |
| EP | 506 514 | 9/1992 |
| EP | 0 652 142 | 10/1995 |
| EP | 0 807 734 | 11/1997 |
| EP | 0 881 111 | 12/1998 |
| FR | 791485 | 12/1935 |
| FR | 2544267 | 10/1984 |
| FR | 2698060 | 5/1994 |
| FR | 2724616 | 3/1996 |
| GB | 365603 | * 1/1932 |
| GB | 1448892 | 9/1976 |
| GB | 2141520 | 12/1984 |
| WO | PCT/GB96/00695 | 3/1996 |
| WO | PCT/GB96/00718 | 3/1996 |
| WO | PCT/DE97/02531 | 10/1997 |

OTHER PUBLICATIONS

Miscellaneous Tailgate Photographs, 26 sheets, admitted prior art.

Primary Examiner—John Kim
Assistant Examiner—Laura C Cole
(74) Attorney, Agent, or Firm—Jacox Meckstroth & Jenkins

(57) ABSTRACT

A wiper arm window latch system and method includes an end of a wiper arm which is mounted on a window and which is received in a drive coupler coupled to a drive motor mounted on a door. The drive coupler permits the wiper arm to be drivingly coupled to a wiper motor. The drive coupler and end of the wiper arm also cooperate to lock the wiper arm to the drive coupler, thereby causing the window of the vehicle to be locked in a closed position, such as against the door. This system and method is particularly suited for use in a vehicle having a rear window which is pivotable between an open position and a closed position and where a rear window wiper is desired or required.

11 Claims, 4 Drawing Sheets

U.S. PATENT DOCUMENTS

| | | |
|---|---|---|
| 4,119,341 A | 10/1978 | Cook |
| 4,336,482 A | 6/1982 | Goertler et al. |
| 4,822,098 A | 4/1989 | Vogt et al. |
| 4,962,564 A | 10/1990 | Onda et al. |
| 5,495,637 A | 3/1996 | Egner-Walter |
| 5,519,258 A | 5/1996 | Stroven et al. |
| 5,559,410 A | 9/1996 | Papazian et al. |
| 5,563,483 A | 10/1996 | Kowall et al. |
| 5,621,942 A | 4/1997 | Eustache et al. |
| 5,694,812 A | 12/1997 | Maue et al. |
| 5,764,010 A | 6/1998 | Maue et al. |
| 5,771,526 A | 6/1998 | Burton |
| 5,823,065 A | 10/1998 | Egner-Walter |
| 5,841,249 A | 11/1998 | Zimmer et al. |
| 5,844,382 A | 12/1998 | Dan |
| 5,847,519 A | 12/1998 | Kilker |
| 5,852,943 A | 12/1998 | Dutka et al. |
| 5,903,114 A | 5/1999 | Miller et al. |
| 5,907,885 A | 6/1999 | Tilli et al. |
| 5,916,327 A | 6/1999 | Maue et al. |
| 5,924,324 A | 7/1999 | Kilker et al. |
| 5,934,798 A | 8/1999 | Roller et al. |
| 5,947,536 A | 9/1999 | Mizuka et al. |
| 5,949,206 A | 9/1999 | Oruganty et al. |
| 6,240,593 B1 | 6/2001 | Murata |
| 6,493,900 B1 | 12/2002 | Koumo |
| 6,792,643 B1 * | 9/2004 | Ponziani .................. 15/250.31 |

* cited by examiner

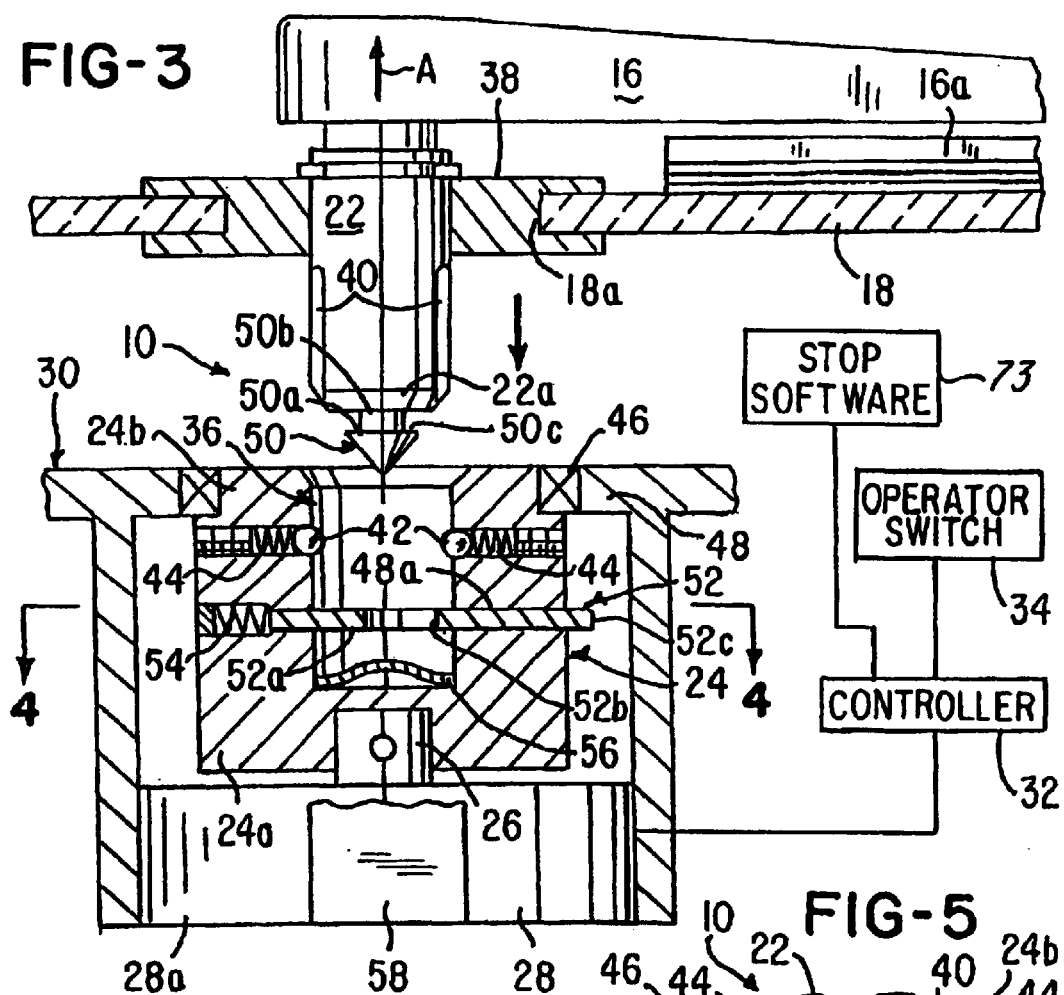
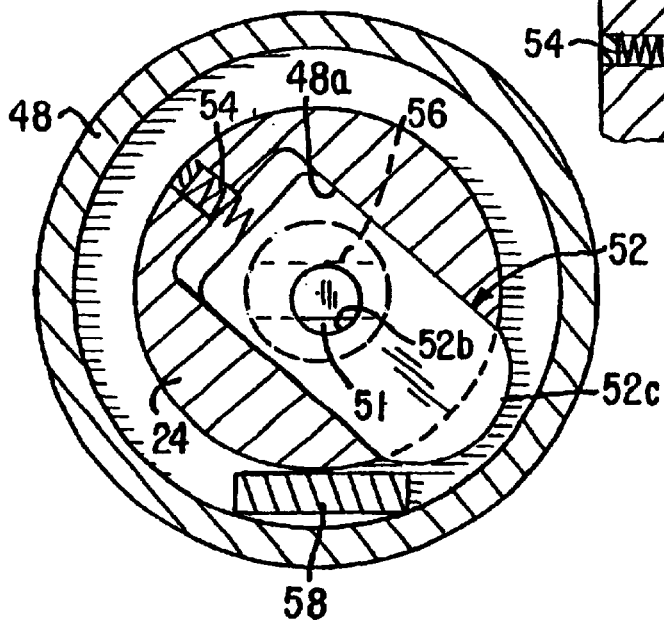

WINDOW WIPER ARM DRIVE AND WINDOW LOCK SYSTEM

CROSS REFERENCE TO RELATED APPLICATION

This application is a division of U.S. Ser. No. 09/607,294 filed Jun. 30, 2000, which is issued as U.S. Pat. No. 6,792,643 and also is a continuation-in-part of U.S. Ser. No. 09/169,451 filed Oct. 9, 1998, which is issued as U.S. Pat. No. 6,109,672.

BACKGROUND OF THE INVENTION

1. Field of the Invention

This invention relates to window wiper systems and, more particularly, to a wiper system and method for coupling a wiper arm to a drive motor and also for retaining a window in a closed position.

2. Description of the Related Art

In the field in windshield wiper systems, such as rear window wiper systems, a window wiper arm is mounted on a rear window hatch or door of a vehicle. The rear window is pivotable between an open and closed position to provide access inside the vehicle. The window wiper arm is usually directly coupled to a wiper motor which, in turn, is mounted directly on the window or below the window on the door.

In one prior art system, for example, the window wiper arm is mounted on a wiper motor which is mounted on a rear door of a vehicle. When it is desired to open the window, the window wiper arm and wiper blade are driven below the bottom of the window to permit the rear window to swing open. Unfortunately, this design approach has several disadvantages, including requiring and causing the wiper blade to be driven below the window and onto the door.

In several prior art systems, the window requires a separate latch to latch and lock the window in a closed position. Because it is desired to place the window wiper arm at an approximate center of the rear window, this latch would have to be located "off center." Because of the non-centered location of the window latch, it was not uncommon that the window would not seal properly to the door, thereby resulting in undesirable wind noise during vehicle operation or even water leakage into the interior compartment of the vehicle.

In some prior art systems, both the latch assembly, including any latch motor, and a window wiper motor were mounted in the door. Such systems oftentimes required the use of multiple motors and apparatus to accomplish the functions of wiping the window and locking the window in a closed position to the door.

What is needed, therefore, is a simple system and method for both wiping the window and locking the door that reduces or eliminates the problems with the prior art.

SUMMARY OF THE INVENTION

It is, therefore, a primary object of the invention to provide a system and method for locking a window, such as a rear window, to a door and also for wiping the window free of debris.

It is another object of the invention to provide a window wiper arm having an end which is rotatably mounted in a window and which can be coupled to a drive motor in order to lock the window to a door and also to permit the drive motor to drive the wiper arm to clean the window.

In one aspect, this invention comprises a wiper arm window latch system comprising a wiper arm rotatably mounted in a window for wiping a window, a drive motor for driving a wiper arm, and a drive coupler for coupling a wiper arm to a drive motor in order to latch a window to a door and also for coupling a wiper arm to a drive motor such that when a window is in a closed position a wiper arm may be rotatably driven by a drive motor.

In another aspect, this invention comprises a wiper system comprising a wiper arm, a wiper system comprising a wiper motor comprising an output shaft having a drive latch assembly, a drive latch assembly comprising a latch release for detachably latching a wiper arm to a wiper motor so that a window becomes locked to a door, and a resilient detent for detachably coupling a wiper arm to an output shaft, regardless of a rotational position of a wiper arm.

In still another aspect, this invention comprises a method for locking a window onto a door and a wiper arm onto an output shaft of a motor comprising the steps of rotatably mounting a wiper arm onto a window, mounting a drive motor for driving a wiper arm onto a door, and situating a drive latch onto a drive motor, a drive latch latching a window to a door when a window is in a closed position and substantially simultaneously coupling a wiper arm to a drive motor such that when a window is in a closed position a wiper arm may be driven by a drive motor.

In yet another aspect, this invention comprises a method for latching a window to a door, with the method comprising the steps of rotatably mounting a wiper arm on a window, using a drive coupler to couple a wiper arm to a drive motor and to also retain the window in a closed position.

Other objects and advantages of the invention will be apparent from the following description, the accompanying drawings, and the appended claims.

BRIEF DESCRIPTION OF THE ACCOMPANYING DRAWINGS

FIG. 3 is a fragmentary view taken along the line 3—3 in FIG. 2;

FIG. 4 is a sectional view taken along the line 4—4 in FIG. 3;

FIG. 5 is a sectional view showing details of an end of the wiper arm for receipt into a receiving area and a detent engaging a locking member;

DETAILED DESCRIPTION OF THE PREFERRED EMBODIMENT

Figure 1:
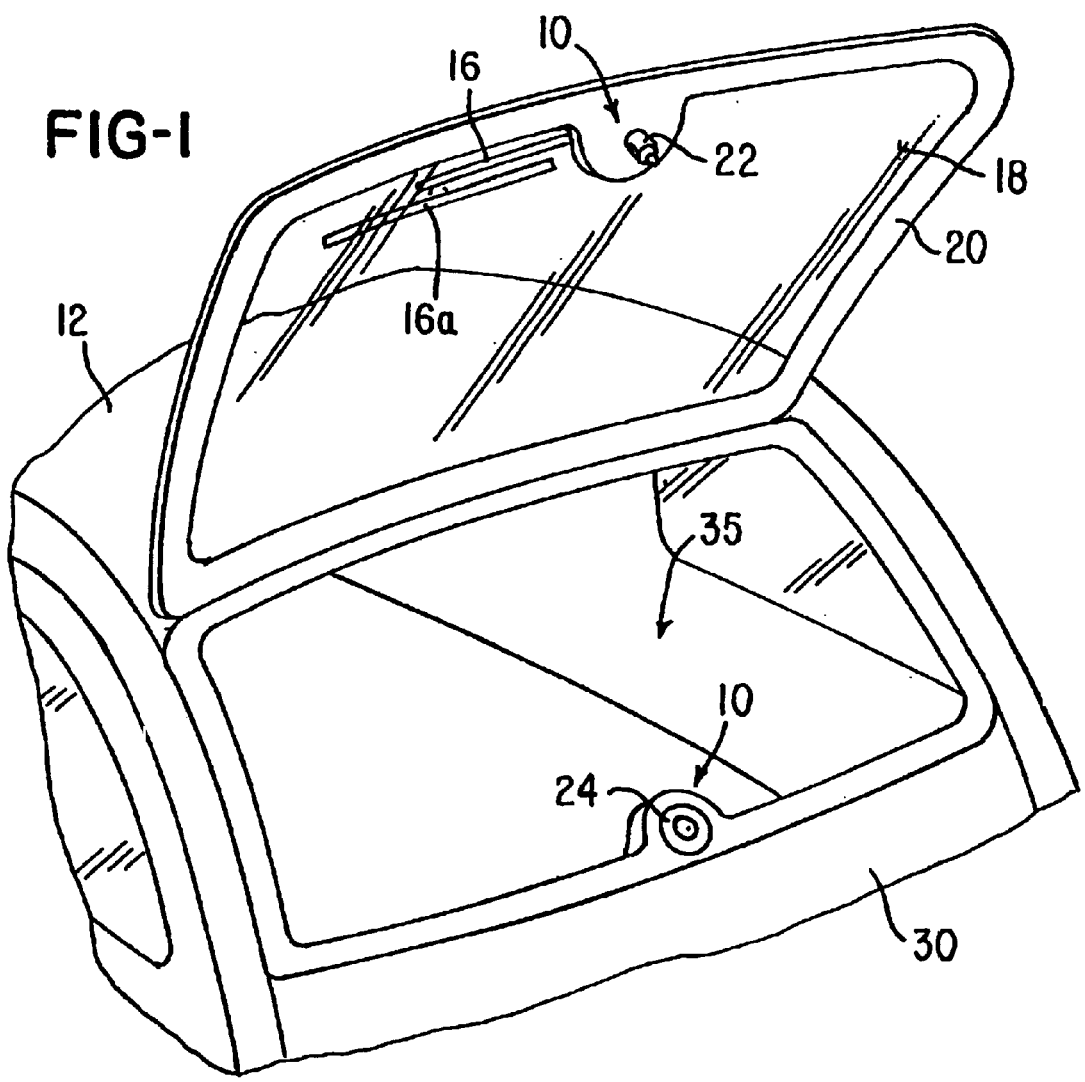
FIG. 1 is a fragmentary view showing a window in an open position.
Figure 2:
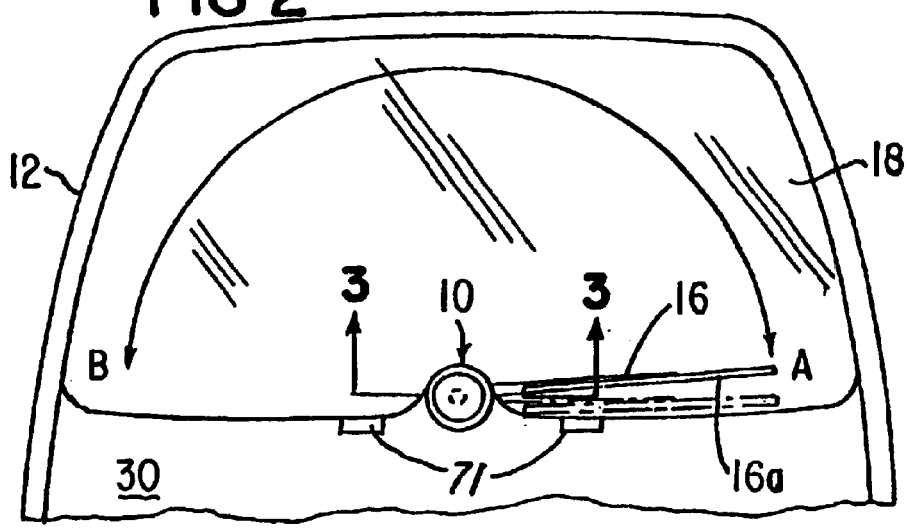
FIG. 2 is a fragmentary view showing the window in a closed position.

Referring now to FIG. 1, a wiper arm window latch system 10 is shown for use on a vehicle 12 having a window, such as a rear window 18 which is hingably attached to the vehicle 12 to permit movement between an open position (shown in FIG. 1) and a closed position (shown in FIG. 2).

The wiper system 10 comprises a wiper arm 16 having a wiper blade 16a which is driven between a first wipe position A (shown in FIG. 2) to a second wipe position B in order to wipe the window 18 which is situated in a frame 20 (FIG. 1), free of debris, such as rain, snow or ice. Although not shown, it is envisioned that the wiper arm window latch system 10 may be used with a window 18 which itself is hingably attached to the vehicle 12 without the use of a frame 20.

The wiper arm window latch system 10 comprises a rotatable and generally cylindrical rotatable member or post 22 on which the wiper arm 16 is mounted. The rotatable member 22 cooperates with a receiving drive coupler 24 to couple the wiper arm 16 to an output shaft 26 (FIG. 3) of a drive motor 28 which is mounted in a door 30 (FIGS. 1 and 2) of the vehicle. As will be appreciated from the description later herein, the drive coupler 24 not only couples the wiper arm 16 to the drive motor 28, but also provides the locking mechanism for retaining and locking the window 18 in the closed position shown in FIG. 2.

Referring now to FIG. 3, the drive motor 28 may be any suitable drive motor for driving wiper arm 16, such as drive motor 4BE available from Valeo, Auburn Hills, Mich. The drive motor 28 has the output shaft 26 which is secured by conventional means, such as a cotter pin, screw, key or retention ring to an end 24a of the drive coupler 24. As mentioned earlier herein, the drive coupler 24 couples and locks the wiper arm 16 to the drive motor 28 in order to latch the window 18 to the door 30 (FIG. 2). The drive coupler 24 also couples the wiper arm 16 to the drive motor 28 so that when the window 18 is in the closed position, the drive motor 28 may be energized by a controller 32 in order to rotatably drive the wiper motor 28 between the wipe positions A and B (FIG. 2) in order to wipe the window 18 free of debris.

The controller 32 is coupled to an operator switch 34 for controlling the operation of the wiper motor 28 in the manner described herein. The switch 34 is situated in the vehicle compartment 35 (FIG. 1) and may be any suitable switch, such as a rotary switch integrated into a turn signal indicator (not shown) or light control switch (not shown).

The drive coupler 24 comprises a receiving area 36 for receiving the rotatable member 22 and for securing the rotatable member 22 to the wiper arm 16. Note in FIG. 3 that the rotatable member 22 is rotatably secured in a bearing 38 in the window 18 as shown. In the embodiment being described, the bearing 38 is mounted in an aperture 18a in the glass 18 as shown.

Note that the rotatable member 22 comprises means for securing the rotatable member 22 to the drive coupler 24. In the embodiment being described, such means includes a plurality of recessed sockets 40 which cooperate with a plurality of balls 42 which are biased by springs 44 to lock into sockets 40 when the rotatable member 22 is fully received in receiving area 36 in order to lock the rotatable member 22 in the receiving area 36 of the drive coupler 24. It should also be appreciated that any suitable means may be used to couple the rotatable member 22 to the drive coupler 24.

The drive coupler 24 has a first end 24a mounted to the output shaft 26 of drive motor 28, as mentioned earlier, and a second end 24b rotatably mounted in a bearing 46 mentioned in a housing 48 in which the drive motor 28 is also securely mounted. Although not shown, it should be appreciated that the housing 48 may be integral with a housing 28a of drive motor 28. In the embodiment being described, the bearing 46 may be a sleeve bearing or ball bearing.

As previously mentioned, a feature of the wiper arm window latch system 10 is that it functions to retain, latch or lock the window 18 to the door 30 (FIG. 2) in order to retain the window 18 in a locked and closed position. In order to facilitate achieving this function and feature, the rotatable member 22 comprises a conically-shaped detent 50 (FIG. 3) and cylindrical connector portion 50b which is situated on an end 22a of the rotatable member 22. The detent 50 cooperates with a movable or actuatable lock or latch 52 which is driven among several positions, including a closed and locking position (shown in FIGS. 3, 7 and 8), a partially open position (shown in FIG. 5) and a fully opened position (shown in FIG. 9). The movement among these positions will be described in further detail later herein.

Note that the lock 52 is received in a slot 48a in drive coupler 24 (FIG. 5) is biased by a spring 54 (FIG. 3) to the locking position. The latch system further comprises a spring 56 situated in drive coupler 24 for biasing and forcing a flange 50a of detent 50 against a bottom surface 52a of lock 52 when the drive coupler 24 is in the locked and latched position.

As illustrated in FIGS. 4, 7–9, the latch 52 comprises an aperture 51 in wall 52b for receiving the detent 50. It should be appreciated that the spring 56 biases the rotatable member 22 in the direction of arrow A in FIG. 3 so that when the lock 52 is actuated to an open position (shown in FIG. 9 as described later), the detent 50 of rotatable member 22 is biased out of wall 52b and the rotatable member 22 is actuated out of receiving area 36. This enables the wiper arm 16 to be forced, biased or actuated towards the open position shown in FIG. 1.

Figure 6:
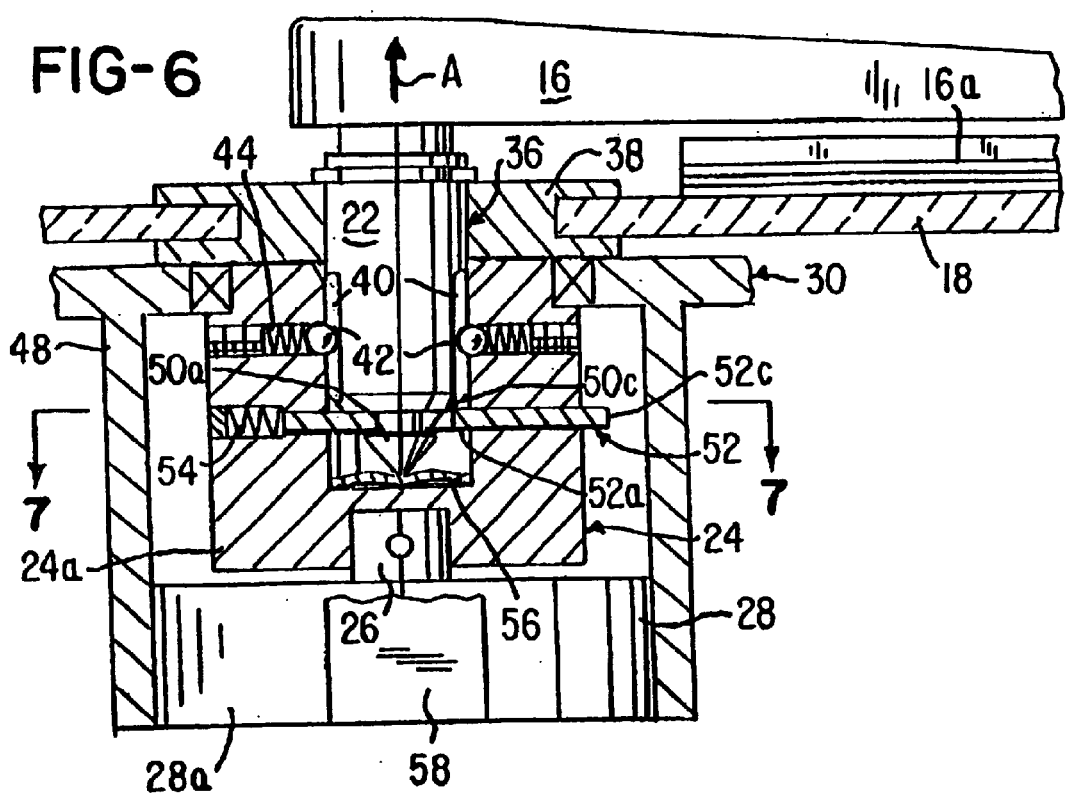
FIG. 6 is a sectional view similar to FIG. 3 showing the wiper arm in a fully locked position.

When the rotatable member 22 is driven into receiving area 36, conically-shaped flange 50a having an engaging surface 50c of detent 50 acts upon wall 52b to become driven in a direction opposite arrow A in FIG. 3 until flange 50a passes bottom surface 52a. At this point, wall 52b engages a cylindrical connector portion 50b which couples detent 50 to rotatable member 22. As best illustrated in FIGS. 4–6, note that once the rotatable member 22 is driven until flange 50a clears bottom surface 52a, the lock 52 is biased by spring 54 to the right (as viewed in FIG. 6). Note also that spring 56 biases the rotatable member 22 in the direction of arrow A in FIG. 6 such that the surface 50c becomes biased against the bottom surface 52a. This causes the rotatable members 22 to be locked in drive coupler 24 and also causes the wiper arm 16 to be locked to drive motor 28, thereby also simultaneously locking window 18 to door 30.

Figure 9:
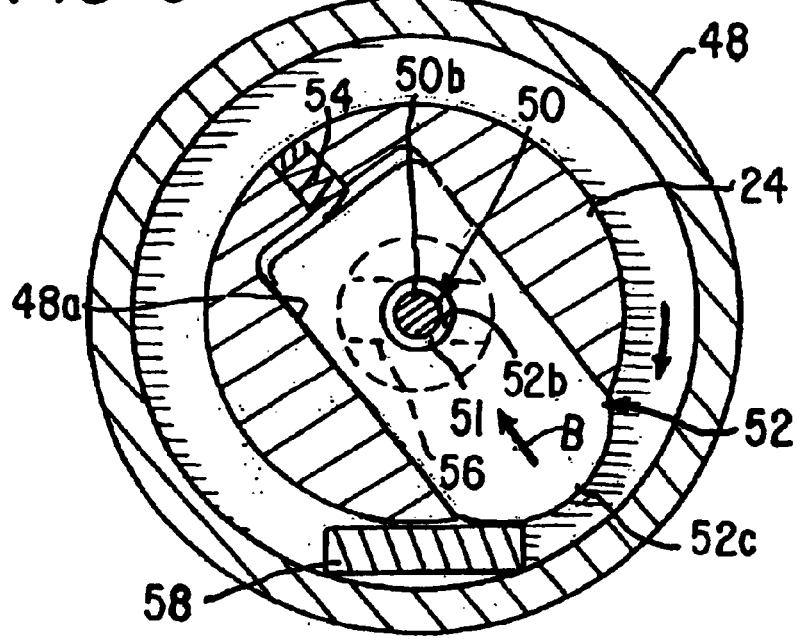
FIG. 9 is a view showing a cam member of a lock or locking member engaging a cam wall to permit the wiper arm to be biased out of the drive coupler.

It should be appreciated that it is only until the lock 52 is again biased to the left (as viewed in FIG. 6) to compress the spring 54 that the rotatable member 22 becomes unlocked from drive coupler 24. As illustrated in FIG. 9, in order to move aperture 51 and wall 52b such that a center axis of aperture 51 and a center axis of detent 50 and cylindrical connector portion 50b becomes coaxial as shown in FIG. 9. This alignment causes the detent 50 to be capable of being forced through aperture 51 of lock 52.

In order to cause the lock 52 to compress spring 54 and move to the left (as viewed in FIG. 6), the lock 52 is provided with a cam end 52c which is driven into engagement with a cam wall 58 on housing 48 when an operator actuates the operator switch 34 (FIG. 3) to open the window 18, as will be described later herein.

Figure 7:
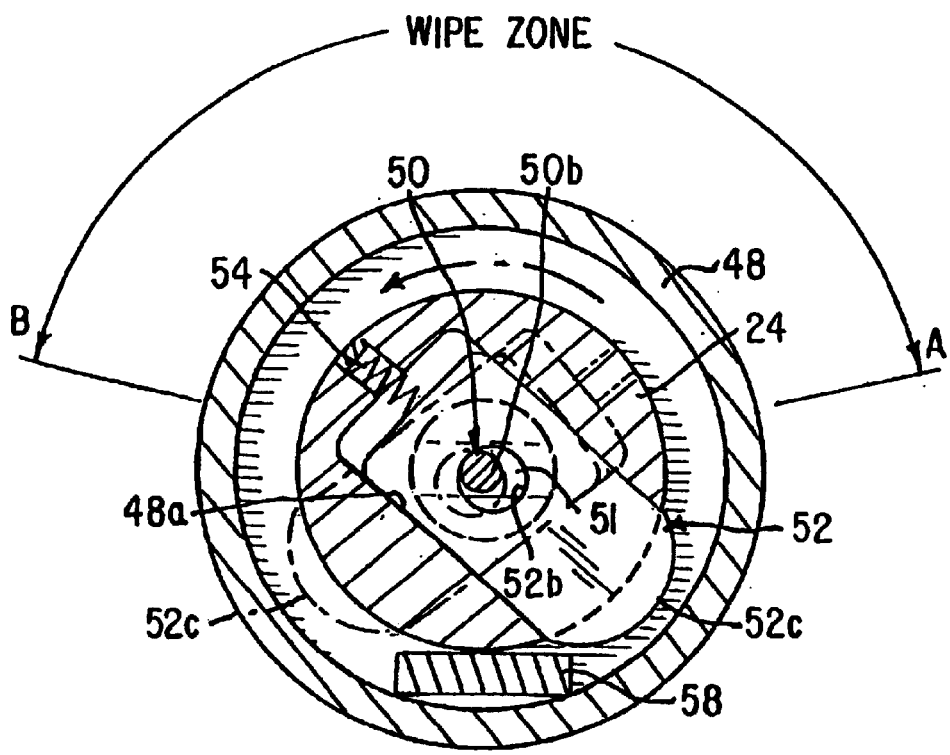
FIG. 7 is a view taken along the line 7—7 in FIG. 6 and showing a coupler in a first wipe position.
Figure 8:
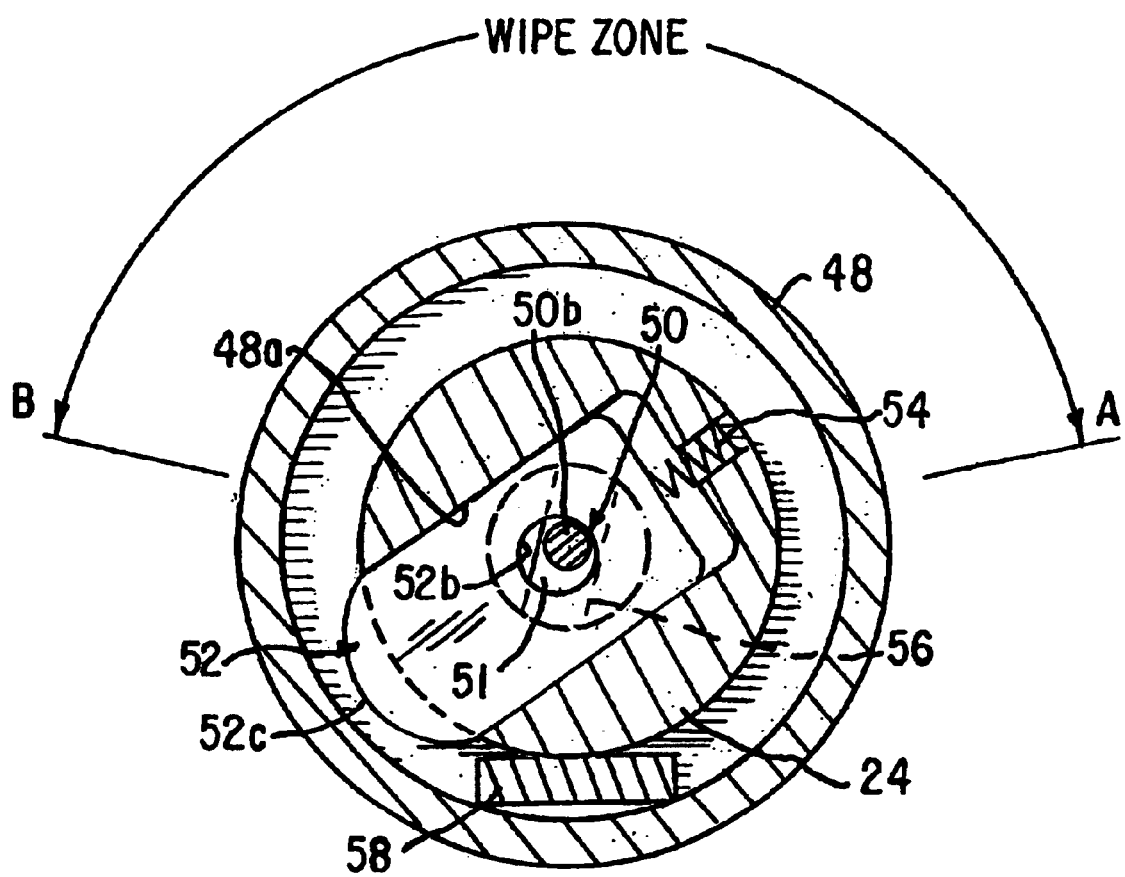
FIG. 8 is a view similar to FIG. 7 illustrating the coupler driven to a second wipe position which is opposite to the wipe position shown in FIG. 7.

As illustrated in FIGS. 4 and 7–9, after the wiper arm 16 is locked to drive motor 28 (by moving the window 18 to the closed position in FIG. 2), an operator may actuate the operator switch 34 when it is desired to either wipe or open the window 18. In response to an open command, the controller 32 energizes drive motor 28 to drive the wiper arm 16 and wiper blade 16a between the wipe positions A and B in order to remove any debris from the window 18 in a wipe zone defined between the area between positions A and B. As the drive motor 28 drives the wiper blade 16, the drive coupler 24 is also rotatably driven or oscillated between wipe positions A and B, as illustrated in FIGS. 7 and 8, in response to a window wipe signal from controller 32, which is generated in response to an operator actuating the operator switch 34. When it is desired to open the window 18 (for example, when the vehicle is stopped), the operator actuates the operator switch 34 to cause controller 32 to energize drive motor 28 to rotatable drive the drive coupler 24 and lock 52 until the wiper arm 16 is driven into a stop 71 (FIG. 2), causing the motor torque to overcome the balls 42 and socket 40 drive couple, thereby de-coupling the drive coupler 24 from the rotatable member 22. Past this point, the wiper arm 16 remains in the park position on the glass while the cam end 52c is driven against a cam wall 58, as illustrated in FIG. 9. This forces the lock 52 to move in the direction of arrow B in FIG. 9, thereby compressing spring 54 until the center axis defined by wall 52b and the axis of connector portion 50b of detent 50 becomes coaxial. At this point, spring 56 forces surface 50c of detent 50 in the direction of arrow A (FIG. 3), thereby forcing the rotatable member 22 out of receiving area 36. This, in turn, causes thereby moving the window 18 to be driven towards the open position shown in FIG. 1.

Advantageously, this system 10 provides a system and method for latching the window 18 to the door 30 by rotatably mounting the wiper arm 16 onto the window 18 and also for retaining the window 18 in the closed and locked position shown in FIG. 2.

Advantageously, this system and method provides means for using the drive motor 28 to not only drive the window wiper arm 16, but also to lock the window 18 to the door 30.

Another advantage of this invention is the balls 42 and sockets 40 design which permits the wiper arm 16 to be in any rotated 180E position when the rotatable member 22 is received in receiving area 36 of drive coupler 24, yet still be capable of being received in the receiving area 36. If the rotatable member 22 is received in receiving area 36 and the balls 42 and sockets 40 are not aligned when the drive motor 28 is energized by controller 32, the drive coupler 24 is rotatably driven and the balls 42 are biased against the rotatable member 22 and will "hunt" until they find the sockets 40, thereby locking the rotatable member 22 and wiper arm 16 to the wiper motor 28. This could be achieved by either manually moving the wiper arm or turning on the wiper motor.

It should be understood that a wiper torque, defined by the torque which the balls 42 and sockets 40 secure rotatable member 22 to the drive coupler 24 is less than a resilient detent torque, defined by a torque required to drive lock 52 to the open position (i.e., to the leftmost position shown in FIG. 6). The resilient detent torque and wiper torque are both less than the torque of the drive motor 28.

It should also be understood that the drive coupler 24 could be arranged on an end of wiper arm 16, with the shaft 26 of drive motor 28 being configured to snap fit or lock onto the drive coupler 24.

Finally, although not shown, the system and method may include a mechanical stop 71 (FIG. 2) or software 73 for causing controller 32 to stop the wiper arm 16 in order to keep the arm 16 and blade 16a on the window 18 during open and close operations. This also facilitates actuation of the latch and preventing the wiper arm 16 from interfering with or disturbing an operator.

While the methods herein described, and the forms of apparatus for carrying these methods into effect, constitute preferred embodiments of this invention, it is to be understood that the invention is not limited to these precise methods and forms of apparatus, and that changes may be made in either without departing from the scope of the invention, which is defined in the appended claims.

What is claimed is:

1. A method for locking a window onto a door and a wiper arm onto output shaft of a motor comprising the steps of:
   providing a drive latch comprising a receiver for receiving an end of said wiper arm wherein said end comprises at least one groove;
   said drive latch comprising a lock comprising a resilient detent for cooperating with said at least one groove to lock said end of said wiper arm in said receiver;
   rotatably mounting a wiper arm onto said window;
   mounting a drive motor for driving said wiper arm onto a door; and
   situating said drive latch onto said drive motor, said drive latch latching said window to said door when said window is in a closed position and substantially simultaneously coupling said wiper arm to said drive motor such that when said window is in said closed position said wiper arm may be driven by said drive motor while said drive latch retains said window in said closed position.

2. The method as recited in claim 1 wherein said drive latch comprises an axis, said method comprising the step of:
   situating at least one spring-loaded ball biased towards said axis in said drive latch to be received in said at least one groove in order to detachably lock said end of said wiper arm in said receiver.

3. The method as recited in claim 1 wherein said method further comprises the step of:
   providing a window wiper arm comprising an associated wiper torque defined by a torque at which said at least one spring-loaded ball becomes biased in said at least one groove, which is less than a resilient detent torque defined by a torque required to drive said lock to open position and which is less than a drive motor torque defined by a torque at which the drive motor drive the wiper arm of said rive motor.

4. A method for locking a window onto a door and a wiper arm onto an output shaft of a motor comprising the steps of:
   providing a window wiper comprising an end having a wiper latch, providing a drive latch comprising a cam member which cooperates with said wiper latch to lock said window to said door while permitting said wiper arm to rotate when driven by said drive motor;
   rotatably mounting said wiper arm onto said window;
   mounting a drive motor for driving said wiper arm onto a door; and
   situating said drive latch onto said drive motor, said drive latch latching said window to said door when said window is in a closed position and substantially simultaneously coupling said wiper arm to said drive motor such that when said window is in said closed position said wiper arm may be driven by said drive motor while said drive latch retains said window in said closed position.

5. The method as recited in claim 4 wherein said drive latch further comprises a cam wall, said method comprising the step of:

provisioning said cam wall in proximity to said cam member so that when said drive motor drives said wiper blade to a window open position, said window is unlocked.

6. A method for latching a window to a door, said method comprising the steps of:

providing a drive coupler having at least one spring-loaded ball;

rotatably mounting a wiper arm on a window; and using said drive coupler to couple said window arm to a drive motor and to also retain the window in a closed position; said drive coupler retaining and locking said window in a closed position on said door when said drive motor drives said wiper arm.

7. A method for latching a window to a door, said method comprising the steps of:

providing a drive coupler on an output shaft of a drive motor;

providing a wiper arm having a notched end for receipt in said drive coupler in order to permit said end to be snap-fit into said drive coupler;

rotatably mounting said wiper arm on a window; and using said drive coupler to couple said wiper arm to said drive motor and to also retain the window in a closed position; said drive coupler retaining and locking said window in a closed position on said door when said drive motor drives said wiper arm.

8. The method as recited in claim 7 wherein said method further comprises the step of:

providing an end comprising a portion which is conical.

9. The method as recited in claim 8 wherein said method further comprises the step of:

providing a drive coupler having a cam;

providing a controller for controlling the operation of said drive motor such that when said controller energizes said drive motor to open said window, said drive motor drives said drive coupler to cause said cam to engage a cam wall to release said end of said wiper arm, thereby opening said window.

10. A method for locking a window onto a door and a wiper arm onto an output shaft of a motor comprising the steps of:

rotatably mounting a wiper arm onto said window;

mounting a drive motor for driving said wiper arm onto a door; and situating a drive latch onto said drive motor, said drive latch latching said window to said door when said window is in a closed position and substantially simultaneously coupling said wiper arm to said drive motor such that when said window is in said closed position said wiper arm may be driven by said drive motor while said drive latch retains said window in said closed position; and driving said drive latch to a first position where said drive motor is de-coupled from said wiper arm.

11. The method as recited in claim 10 wherein said method further comprises the step of:

driving said drive latch to a second position where said window becomes unlatched from said door.

* * * * *